United States Patent [19]
Brogardh et al.

[11] 4,451,730
[45] May 29, 1984

[54] OPTICAL MEASURING APPARATUS FOR MEASURING FORCE OR PRESSURE

[75] Inventors: Torgny Brogardh; Olof Engström; Christer Ovren, all of Västerås, Sweden

[73] Assignee: ASEA Aktiebolag, Västerås, Sweden

[21] Appl. No.: 492,651

[22] Filed: May 9, 1983

Related U.S. Application Data

[63] Continuation of Ser. No. 226,829, Jan. 21, 1981, abandoned.

[30] Foreign Application Priority Data

Jan. 24, 1980 [SE] Sweden .............................. 8000558

[51] Int. Cl.³ .............................................. G01D 5/26
[52] U.S. Cl. ................................ 250/227; 250/231 P; 73/800; 356/32
[58] Field of Search ............... 250/227, 231 R, 231 P; 357/17, 19, 26; 73/763, 777, 800; 356/32–35, 35.5

[56] References Cited

U.S. PATENT DOCUMENTS

| 3,525,947 | 8/1970 | Winstel et al. | 357/17 X |
| 3,676,795 | 7/1972 | Pratt, Jr. | 357/26 X |
| 4,249,076 | 2/1981 | Bergstrom et al. | 250/231 R X |
| 4,270,050 | 5/1981 | Brogardh | 250/231 R |

Primary Examiner—David C. Nelms
Assistant Examiner—Edward P. Westin
Attorney, Agent, or Firm—Watson, Cole, Grindle & Watson

[57] ABSTRACT

An optical measuring apparatus for measuring force or pressure, having at least one light source, at least one optical fiber for passing light from and to a sensor, and one detector system. The sensor includes a material having pressure- and force-dependent photo luminescence properties, the signal received in the detector system being dependent on the pressure or the force applied to the sensor.

34 Claims, 15 Drawing Figures

OPTICAL MEASURING APPARATUS FOR MEASURING FORCE OR PRESSURE

This application is a continuation application of application Ser. No. 226,829, filed Jan. 21, 1981, now abandoned.

TECHNICAL FIELD

This invention relates to an optical measuring apparatus for measuring force or pressure, comprising at least one light source, an optical fiber system comprising at least one optical fiber for passing light from and to a pressure or force sensing means, and one detector system. In order to simplify the wording of the specification, the word "force" is used in both the ensuing description and the appended claims to mean either a force per unit area (i.e. a pressure) or a total force. Furthermore, in both the ensuing description and the appended claims, the term "light" means electromagnetic radiation preferably in the wavelength range of from 0.1 to 10 microns.

BACKGROUND ART

In published British patent application No. 2034460A there is described an optical measuring apparatus for measuring physical quantities, comprising a transducer with a body constituting an optical modulator. The optical properties of the modulator are dependent on mechanical forces acting on the modulator. The optical property utilized in this case is the force dependence of at least one light absorption edge of the absorption spectrum of the modulator material. Optical fibers are used for leading light into the modulator and for leading out light that has passed through the modulator.

An object of the present invention is to provide an alternative to the optical measuring apparatus described in the aforesaid British patent application.

DISCLOSURE OF THE INVENTION

According to the present invention, in an optical measuring apparatus for measuring a force, which comprises at least one light source, an optical fiber system comprising at least one optical fiber for conducting light from and to a force sensing mechanism, and one detector system, the sensing mechanism includes a material having force-dependent photo-luminescence properties, the optical signal received in the detector system being dependent on the force applied to the sensing mechanism. Thus, the force-dependent photo-luminescence effect of solid materials, for example semiconductor materials, is utilized in the present invention.

Compared with the optical measuring apparatus described in the aforesaid British patent application No. 2034460A, optical measuring apparatus in accordance with the present invention has the advantage that the system may be designed so that the measuring signal is independent of variations in the intensity, as well as variations in the emitted wavelength, of the light sources employed in the system. Furthermore, the measuring signal may be uninfluenced by reflections in the optical system which allows simple methods of joining optical fibers to be employed and results in a reduced influence of instability on the optical coupling between the force sensing means and the optical fiber system. In addition, the force-dependence of the measuring signal may be made independent of the temperature of the sensor material of the force sensing means.

BRIEF DESCRIPTION OF THE DRAWINGS

The invention will now be described, by way of example, with reference to the accompanying drawings, in which.

DESCRIPTION OF PREFERRED EMBODIMENTS

Figure 1A:
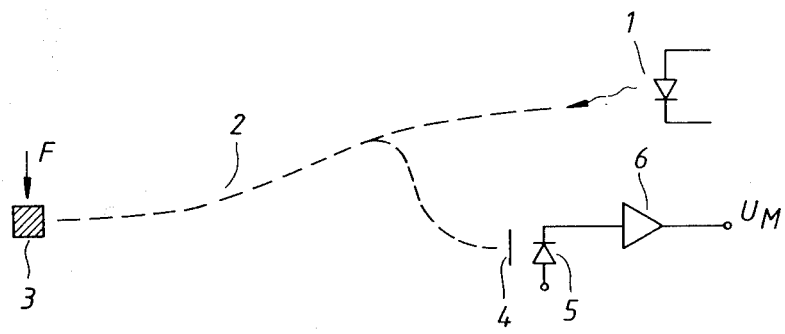
FIG. 1a is a schematic diagram of one embodiment of an optical measuring apparatus in accordance with the invention.

FIG. 1a shows simple apparatus for measuring a force F acting on a sensor 3. One or more light-emitting diodes (LEDs) 1 emit light into an optical fiber system 2 towards the sensor 3, on which the force F acts. The light from the LED 1 causes the sensor 3 to emit light by photo-luminescence, which light is conducted in the optical fiber system 2 towards a detector system consisting of an optical filter 4, a photo-diode 5 and an amplifier 6.

Figure 1B:
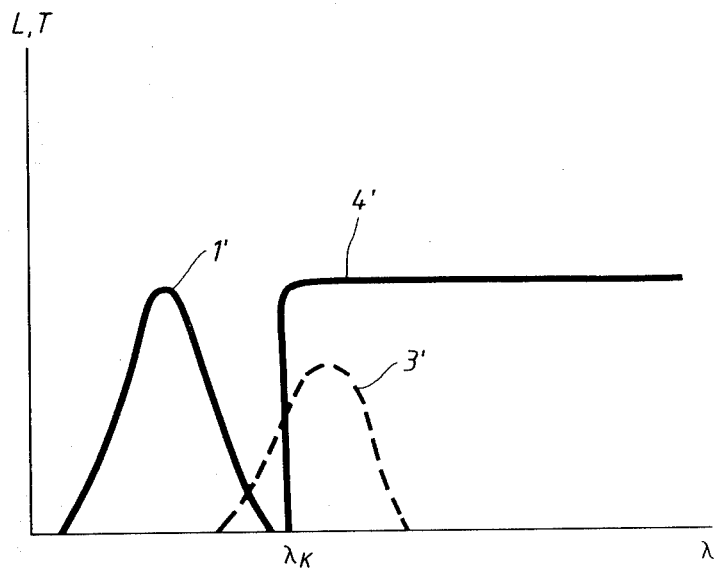
FIG. 1b is a graph showing the spectral shape of the optical signals which occur in the apparatus of FIG. 1a when performing a force measurement.

Figure 1b shows the spectral shape of the optical signals emitted by the LED 1 and the sensor 3 together with the transmission curve 4' for the filter 4, the spectrum of the LED 1 being designated 1' and the luminescence spectrum for the sensor 3 being designated 3' and being shown in dashed lines. It will be appreciated that the filter 4 prevents the light signals from the LED 1 passing to the photo-diode 5 but allows the part of the signal 3' having a wavelength greater than λ to be detected by the photo-diode 5 and passed to the amplifier 6. The dependence of the light signal emitted from the sensor 3 provides a method for the measurement of the force F acting on the sensor 3. Measuring faults may occur, for example, because of variations in the damping of the optical system which may induce fiber bending. These measuring faults may be eliminated by providing an additional detector (not shown)—which may be provided with an optical filter—in the measuring apparatus according to FIG. 1a, which additional detector only detects excitation light e.g. emitted from the LED, reflected from the sensor, and forming a quotient from the two detected signals.

Figure 2A:
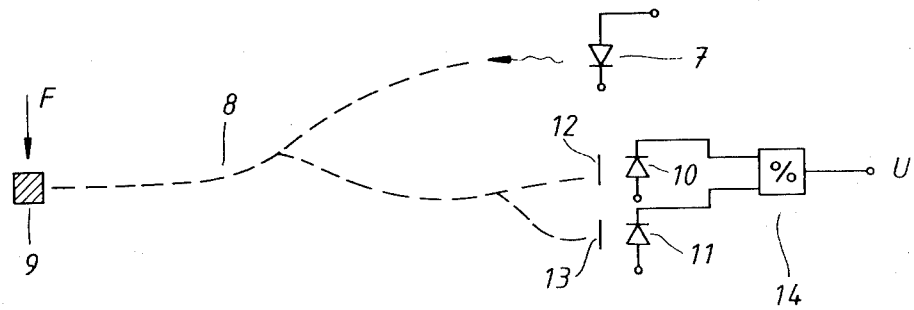
FIG. 2a is a schematic diagram of a second embodiment of an optical measuring apparatus in accordance with the invention.
Figure 2B:
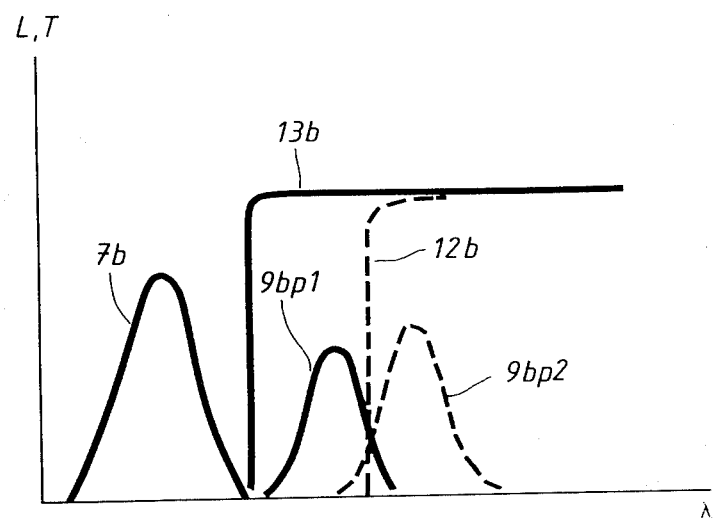
FIG. 2b is a graph showing luminescence intensity and optical transmission plotted against wavelength for the apparatus of FIG. 2a, FIG. 3 is a schematic diagram of a third embodiment of an optical measuring apparatus in accordance with the invention, having a temperature-compensated force sensor.

FIG. 2a shows a further embodiment of a measuring apparatus according to the invention which is intended for measurement of a force F acting on a sensor 9. The measuring apparatus comprises an LED 7, an optical fiber system 8, the sensor 9, photo-diodes 10, 11, optical filters 12, 13 and a quotient-forming member 14. Amplifiers (not shown) may be provided. FIG. 2b graphically illustrates the spectrum 7b of light emitted from the LED 7, the spectrum of light emitted from the sensor 9 at two different forces 9bp1 and 9bp2, (shown in dashed lines) and the transmission curves 12b, 13b for the filters 12 and 13, respectively. In FIG. 2b, the wavelength $\lambda$ is shown on the x-axis and luminescence intensity (L) and optical transmission (t) on the y-axis. Thus, in this case measuring signal U (FIG. 2a) is a measure of the "position" of the luminescence spectrum of the sensor 9 on the wavelength axis ($\lambda$). By quotient formation, measuring faults may be eliminated as hereinbefore mentioned.

Force-dependent luminescence spectra with the above-mentioned properties are obtained upon radiating band-band recombination processes in semiconductor materials (e.g. GaAs) and also upon recombination processes via defect levels in semiconductors (e.g. GaP:N).

With the above-described apparatus, the temperature of the material of the sensor should be sensed since the emitted spectrum is usually temperature dependent. The temperature of the sensor may be measured for example, with the aid of a fiber-optic temperature-measuring apparatus. Alternatively, two identical measuring systems according to FIG. 2a may be used, with one sensor functioning as a standard and being subjected to a known force which may be compared with the measured, unknown force applied to the other sensor.

Temperature compensation of the measuring system may, however, also be obtained by a special embodiment of sensor. An embodiment of such a temperature-compensated pressure sensor with associated measuring system is shown with reference to FIGS. 3, 4 and 5. LEDs 31 and 32 (FIG. 3) emit light into an optical fiber system 33 towards a sensor 34, which is shown in detail in the inset diagram in FIG. 3. The spectra from the light emitted by the two LEDs 31 and 32, which are modulated by frequencies $f_1$ and $f_2$, respectively, are shown in dashed lines at LED 31 and LED 32, respectively, in FIG. 4, where the x-axis represents the photonenergy in eV and the y-axis represents the optical absorption coefficient ($\alpha$) and the relative luminescence intensity (L).

Figure 3:
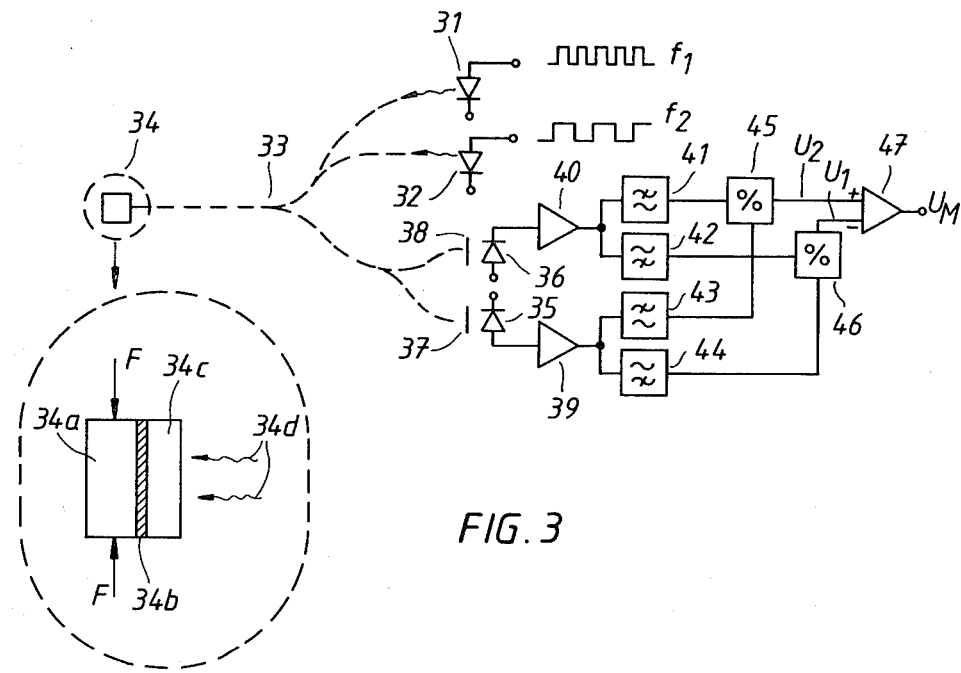
Figure 4:
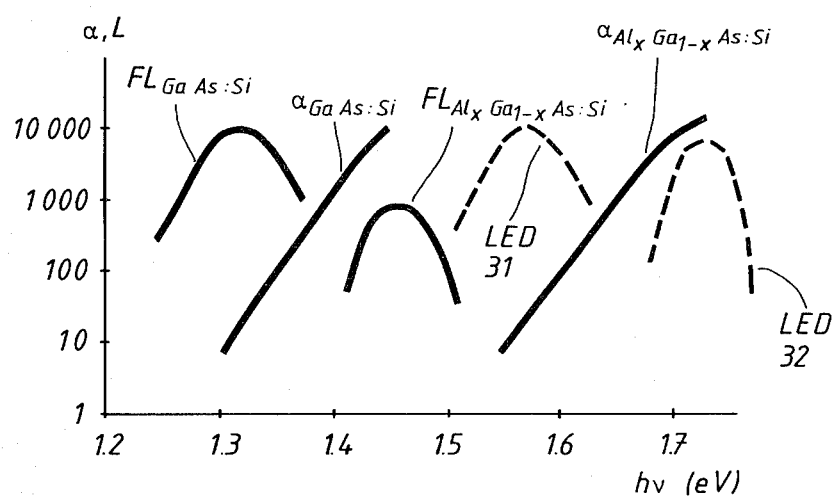
FIGS. 4 and 5 are graphs showing the optical absorption coefficient and luminescence intensity plotted against photon energy, and showing luminescence intensity and optical transmission plotted against photon energy, respectively, for the apparatus of FIG. 3.
Figure 5:
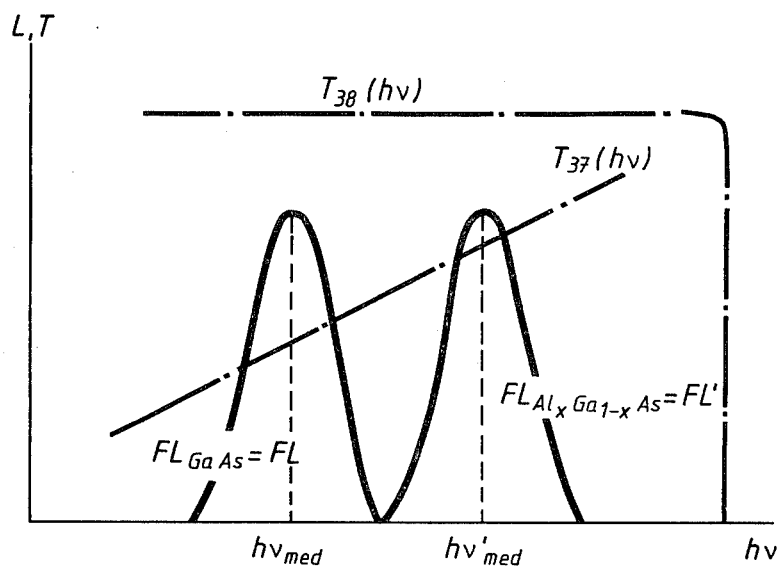

The sensor 34 consists of two materials having different absorption and luminescence properties, a first material 34a consisting of GaAs, a second material 34c consisting of $Al_xGa_{1-x}As$, and a transparent elastic joint 34b joining the first and second materials 34a and 34c together. Only one of the first and second materials is subjected to the force F to be measured, which in the case illustrated, is the material 34a. The optical signals, passing into and out from the sensor 34, are shown at 34d. The sensor materials 34a and 34c may be doped, for example with Si or Ge, to provide the sensor with a high luminescence efficiency, FIG. 4 showing the absorption spectra for the two sensor materials ($\alpha$-curves) when doped with silicon. A suitable design of the sensor involves choosing such a thickness of the compound semiconductor alloy material $Al_xGa_{1-x}As$ that the main portion of the light (LED 32) emitted from the LED 32 is absorbed therein causing the sensor to emit light which is conducted in the optical fiber system 33 towards the detector system. The light (LED 31) emitted from the LED 31 is absorbed only to a minor extent in the $Al_xGa_{1-x}As$ material and is mainly absorbed in the GaAs crystal. The luminescence signal thus emitted from the GaAs is not absorbed in the $Al_xGa_{1-x}As$ crystal and may thus be passed into the optical fiber system and transmitted towards the detector system. The detector system is built up of two photo-detectors 35, 36 (FIG. 3) which are each arranged with an optical filter 37, 38, respectively. The transmission curves of these filters are shown in FIG. 5, where the photon-energy is represented on the x-axis and the intensity (L) and the optical transmission (T) are represented on the y-axis. The signals from the photo-detectors are amplified in amplifiers 39, 40 (FIG. 3). By the action of the electric low pass filters 41 and 43 and high pass filters 42 and 44, the output signals from the two amplifiers are divided into the contributions with the frequencies $f_1$ and $f_2$, whereafter quotient formation of associated signals takes place in quotient forming members 45, 46. Output signals $U_2$ and $U_1$ from members 45 and 46, respectively, are subtracted in unit 47 to obtain the measuring signal $U_M$, the dependence of which on the force F applied to the sensor will be explained hereinafter with reference to FIG. 5. The photodiodes are assumed to have equal sensitivity to light of all wavelengths ("grey" response). The signal $U_2$ from the quotient forming member 45 may be expressed $$U_2 = \frac{\int T_{37}(h\nu) FL'(h\nu) dh\nu}{\int T_{38}(h\nu) FL'(h\nu) dh\nu}$$

The filter 37 is assumed to have the transmission curve:

$$T_{37}(h\nu) = A + Bh\nu$$

Thus:

$$U_2 = \frac{A \int FL'(h\nu) dh\nu + B \int h\nu FL'(h\nu) dh\nu}{\int FL'(h\nu) dh\nu} = A + B h\nu'_{med}$$

Analogously the following is obtained:

$$U_1 = A + Bh\nu_{med}$$

where $U_1$ is the signal from quotient forming member 46.

Thus, the measuring signal may be expressed as $$U_M = U_2 - U_1 = B(h\nu'_{med} - h\nu_{med})$$

The FL curves are the photo-luminescence curves for the two materials (see FIG. 5).

Since the displacement of the luminescence peak for changes in the temperature may be regarded as independent of x in the $Al_xGa_{1-x}As$-system (see "Journal of Applied Physics", volume 47, No. 6, June 1976, pages 2604–2613), the measuring signal $U_M$ will be temperature-independent. A force applied to one of the materials (34a, 34c) included in the sensor, on the other hand, will change the mutual positions of the luminescence peaks, which results in a change in the output signal from the system. Since the transmission curve for the filter 37 is linear with respect to $h\nu$, the change in the output signal—corresponding to a certain force—will be independent of temperature. In other respects, the measuring system possesses the advantages mentioned in connection with the description of the system shown in FIG. 2a. The light source or light sources may comprise LEDs, Schottky diodes, or semiconductor lasers.

The material for the sensor may comprise semiconductor materials, for example AlP, AlAs, GaP, GaAs, InP, InAs, $In_{1-x}Al_xP$, $In_{1-x}Ga_xP$, $Ga_{1-x}Al_xP$, $In_{1-x}Al_xAs$, $In_{1-x}Ga_xAs$, $Ga_{1-x}Al_xAs$, $InAs_{1-y}P_y$, $GaAs_{1-y}P_y$, x and y being between 0 and 1, ZnTe, ZnSe, ZnS, ZnO, CdTe, CdSe and CdS. GaP doped with Zn and $O_2$ or with Cd and $O_2$ or with $N_2$, ZnSe doped with Cu or Mn, and $Al_xGa_{1-x}As$ doped with Ge or Si are examples of possible dopings which may be carried out to obtain materials with a high luminescence efficiency.

Figure 6A:
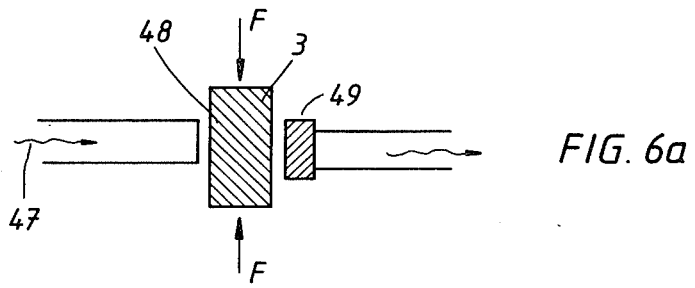
FIG. 6a is a schematic diagram of an alternative embodiment of sensor for obtaining a temperature-dependent measuring signal for employment in optical measuring apparatus in accordance with the invention.
Figure 6B:
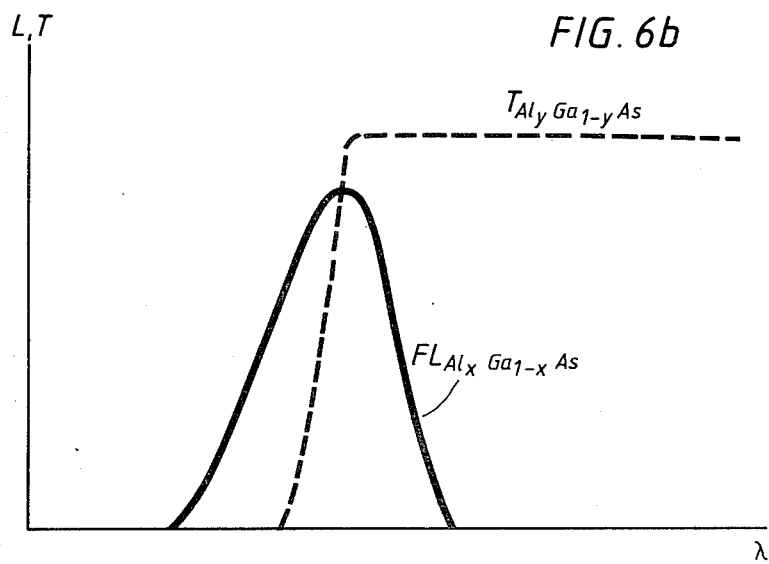
FIG. 6b is a graph showing luminescence intensity and optical transmission plotted against wavelength for the sensor of FIG. 6a, and FIGS. 7a to 7f are schematic diagrams of different embodiments of detector systems for employment in optical measuring apparatus in accordance with the invention.

A further sensor arrangement for obtaining a temperature-independent measuring signal is shown in FIG. 6a. A sensor 3 (see FIG. 6a) includes sensor material $Al_xGa_{1-x}As$, shown at 48, which emits light, with a spectrum according to FIG. 6b, by photo-luminescence. This emitted light passes through an optical filter 49 made of $Al_yGa_{1-y}As$, where y is chosen so that the transmission edge overlaps the luminescence curve, as illustrated in FIG. 6b. The transmission curve of the filter is such that it is displaced on the wavelength axis ($\lambda$) a similar distance as the luminescence spectrum when subjected to varying temperatures. In this case the light intensity transmitted to the optical fiber system is dependent on the force applied to the sensor but not on its temperature.

Semiconductor lasers may be used as light sources instead of LEDs in the system according to FIGS. 3, 4 and 5. In this case the measuring system may be designed with a higher resolution, that is, the system may have a higher value of the quotient $$\frac{U_M(F \neq 0)}{U_M(F = 0)}$$

than is possible using LEDs. Furthermore, by employing the sensor 3 shown in FIG. 6a, which is subjected to the force F, an additional light signal 47, to which the sensor is transparent may be sent. This light signal is intended to be used for compensation of measuring errors which are due, for example, to bending of optical fibers.

Figure 7A:
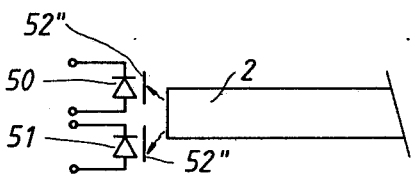

Different alternative detector systems are illustrated in FIGS. 7a to 7f. FIG. 7a, for example, shows a system where the light signal is supplied to two photo-detectors 50, 51 from the end of an optical fiber of the optical fiber system 2. Detectors 50 and 51 are provided with optical filters 52', 52", which have transmission curves similar to those hereinbefore described.

Figure 7B:
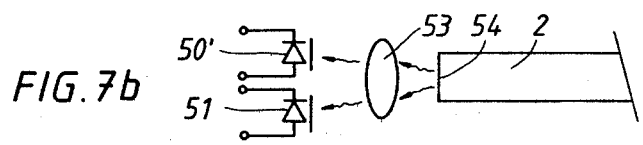

FIG. 7b shows a similar detector system to that shown in FIG. 7a but which is supplemented with a lens 53 by means of which the photo-diodes 50, 51 are focused on the end surface 54 of the optical fiber system 2.

Figure 7C:
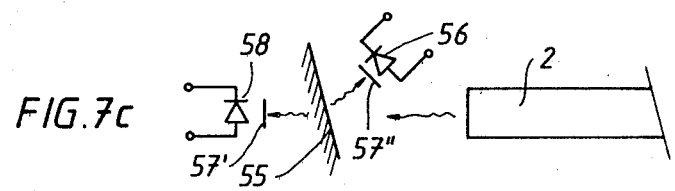
Figure 7D:
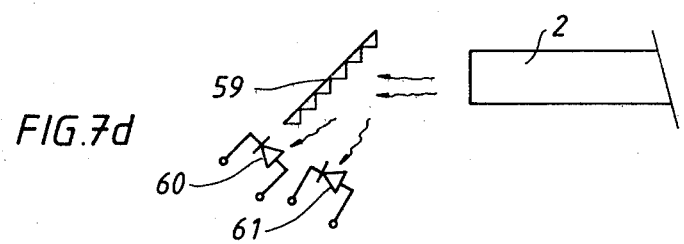
Figure 7E:
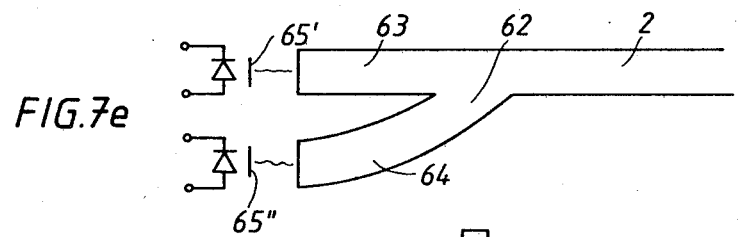

FIGS. 7c, 7d and 7e show different types of so-called beamsplitter systems. FIG. 7c shows a partially transparent mirror 55 positioned so that the light signals from the optical fiber system 2 are partially reflected onto a photodiode 56 via a filter 57", the unreflected light signals passing through the mirror 55 and being transmitted via another filter 57' to a photo-diode 58. Thus, in the same way as in FIGS. 7a and 7b, two different signals are obtained, which may be processed, for example, in a quotient forming member (not shown).

FIG. 7d shows a grating 59 which, in different ways, reflects signals entering from a fiber end of the optical fiber system 2 towards one or the other of photo-diodes 60 and 61. Other possibilities for dividing the optical signal from the fiber system 2 comprise the use of prisms or fiber branches. FIG. 7e for example, shows the optical fiber system divided at branch 62 for passage along optical fibers 63 and 64, the optical signal in the fiber system 2 being divided into two different partial signals for detection by photo-diodes provided with filters 65', 65".

Figure 7F:
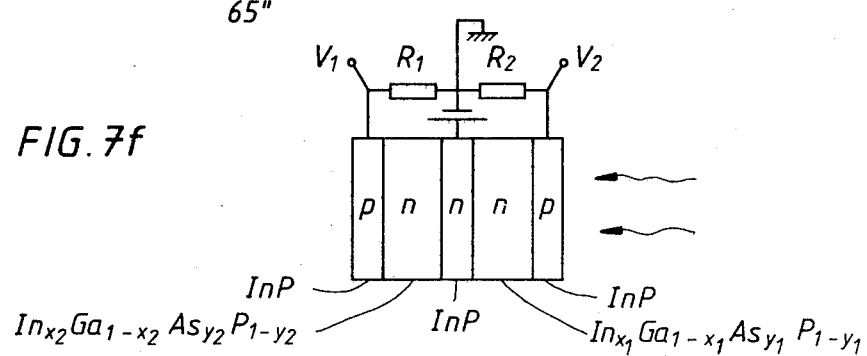

In FIG. 7f there is shown an integrated demultiplexed structure with p-n junctions of a conventional kind which may, for example, be used instead of the two photo-diodes 50, 51 in FIG. 7a, or in similar detector systems. The structure is illuminated with light emitted from the transducer and is located within the detector system. Electric signals may be obtained at terminals $V_1$ and $V_2$. The materials included in the different p and n layers are shown in FIG. 7f and may consist of a pair of spaced-apart p layers of InP, with three n layers positioned therebetween. The central n layer may consist of InP and the other n layers may consist of $In_{x2}Ga_{1-x2}As_{y2}P_{1-y2}$ and $In_{x1}Ga_{1-x1}As_{y1}P_{1-y1}$, respectively. The two quaternary n layers are given different band widths by the choice of $x_1$, $y_1$ and $x_2$, $y_2$, respectively.

The means according to the above may be varied in many ways within the scope of the following claims. For example, the electrical signals from the two photo-diodes shown in the embodiments of FIGS. 2a, 3 and 7a to 7e, instead of being processed subsequently in a quotient-forming member, may be processed in a different function generator, e.g. means for controlling the amplification of a signal from an amplifier included in the detector system, or means for adjusting the intensity of light emitted from the or each light source by, for example, current regulation, to obtain a signal independent of error sources.

What is claimed is:

1. An optical measuring apparatus for measuring a force, comprising at least one light source, an optical fiber system comprising at least one optical fiber for conducting at least one frequency of light from and to a sensing means, and a detector system, wherein said sensing means comprises a material having force-dependent photo-luminescent properties, such that a wavelength shift of the entire spectrum of the emitted photo-luminescent light from said sensing means is produced within at least two different wavelength ranges as a function of the force applied to said sensing means, said optical fiber system directing said photo-luminescent light from said sensing means to said detector system, and said detector system including means for detecting said photo-luminescent light within said at least two different wavelength ranges.

2. An optical measuring apparatus according to claim 1, wherein the detector system includes means for detecting light, for example excitation light from the said light source, reflected from the said sensing means.

3. An optical measuring apparatus according to claim 1, wherein said at least one light source comprises a lightemitting diode.

4. An optical measuring apparatus according to claim 1, wherein said at least one light source comprises a Schottky diode.

5. An optical measuring apparatus according to claim 1, wherein said at least one light source comprises a semiconductor laser.

6. An optical measuring apparatus according to claim 1, wherein said detector system includes at least two photo-detectors for receiving said photo-luminescent light from said sensing means.

7. An optical measuring apparatus according to claim 6, wherein said photo-detectors have non-identical spectral responses.

8. An optical measuring apparatus according to claim 6, wherein at least one of said photo-detectors is provided with an optical filter.

9. An optical measuring apparatus according to claim 6, wherein said optical fiber system is arranged to direct photo-luminescent light directly towards the photo-detectors.

10. An optical measuring apparatus according to claim 6, wherein optical lens means is arranged to focus optical signals from said optical fiber system on to said photo-detectors.

11. An optical measuring apparatus according to claim 6, wherein a partially transparent mirror is positioned so that one of said photo-detectors receives optical signals from said optical fiber system which pass through said mirror and the other of said photo-detectors receives optical signals from said optical fiber system which are reflected from said mirror.

12. An optical measuring apparatus according to claim 6, wherein interference means is provided for dividing said photo-luminescent light from said optical fiber system into partial signals within different wavelength ranges, the different partial signals being directed towards different ones of said photo-detectors.

13. An optical measuring apparatus according to claim 6, wherein said optical fiber system has at least two optical fiber end portions facing towards said detector system, each of said end portions being arranged adjacent a different one of said photo-detectors.

14. An optical measuring apparatus according to claim 1, wherein said detector system comprises a detector in the form of a demultiplexed structure having p-n junctions.

15. An optical measuring apparatus according to claim 6, wherein electrical signals from said photo-detectors are subsequently processed in function-generating means.

16. An optical measuring apparatus according to claim 15, wherein said function-generating means comprises a quotient-forming means.

17. An optical measuring apparatus according to claim 1, wherein said sensing means comprises a first material intended to be subjected to the force to be measured, and a second material.

18. An optical measuring apparatus according to claim 17, wherein said first material has different light absorption properties from said second material.

19. An optical measuring apparatus according to claim 17, wherein said first material has different luminescence properties from said second material.

20. An optical measuring apparatus according to claim 17, wherein two light sources are provided which are arranged to transmit light, along a common portion of said optical fiber system, to said sensing means, one of said first and second materials serving as an optical filter in the ray path to the other of the said first and second materials to enable light, emanating from said two light sources, to be absorbed to a different extent in each of said first and second materials.

21. An optical measuring apparatus according to claim 6, wherein one of said photo-detectors has a transmission response which is substantially linear relative to the photon-energy of the photo-luminescent light detected thereby.

22. An optical measuring apparatus according to claim 6, wherein one of said photo-detectors is provided with an optical filter, said one photo-detector and said optical filter having a transmission response which is substantially linear relative to the photon energy of the photo-luminescent light detected thereby.

23. An optical measuring apparatus according to claim 1, wherein an optical filter is arranged relative to said sensing means so that the photo-luminescent light emitted from said sensing means is arranged to pass through said optical filter, said optical filter having a transmission response which is temperature-dependent in at least substantially the same manner as that of said sensing means.

24. An optical measuring apparatus according to claim 23, wherein said sensing means comprises a first material which is the same material as that of said optical filter.

25. An optical measuring apparatus according to claim 23, wherein said at least one frequency of light comprises a first frequency and a second frequency and wherein there is provided means for transmitting said second frequency of light through said sensing means, said second frequency of light being transparent to said second frequency of light which is intended to be used for compensation of measuring errors.

26. An optical measuring apparatus according to claim 1, wherein said sensing means comprises at least one semiconductor material.

27. An optical measuring apparatus according to claim 26, wherein said at least one semiconductor material is selected from the group consisting of AlP, AlAs, GaP, GaAs, InP, InAs, $In_{1-x}Al_xP$, $In_{1-x}Ga_xP$, $Ga_{1-x}Al_xP$, $In_{1-x}Al_xAs$, $In_{1-x}Ga_xAs$, $Ga_{1-x}Al_xAs$, $InAs_{1-y}P_y$, $GaAs_{1-y}P_y$, x and y being between 0 and 1, ZnTe, ZnSe, ZnS, ZnO, CdTe, CdSe and CdS.

28. An optical measuring apparatus according to claim 26, wherein said at least one semiconductor material comprises GaP doped with Zn and $O_2$.

29. An optical measuring apparatus according to claim 26, wherein said at least one semiconductor material comprises GaP doped with Ce and $O_2$.

30. An optical measuring apparatus according to claim 26, wherein said at least one semiconductor material comprises GaP doped with $N_2$.

31. An optical measuring apparatus according to claim 26, wherein said at least one semiconductor material comprises ZnSe doped with Cu.

32. An optical measuring apparatus according to claim 26, wherein said at least one semiconductor material comprises ZnSe doped with Mn.

33. An optical measuring apparatus according to claim 26, wherein said at least one semiconductor material comprises $Al_xGa_{1-x}As$ doped with Ge.

34. An optical measuring apparatus according to claim 26, wherein said at least one semiconductor material comprises $Al_xGa_{1-x}As$ doped with Si.

* * * * *